United States Patent
Fukumoto et al.

(10) Patent No.: US 11,995,980 B2
(45) Date of Patent: May 28, 2024

(54) COMMUNICATION DEVICE, COMMUNICATION SYSTEM, AND COMMUNICATION METHOD

(71) Applicant: MAKITA CORPORATION, Anjo (JP)

(72) Inventors: Masaaki Fukumoto, Anjo (JP); Hiroshi Inoue, Anjo (JP)

(73) Assignee: MAKITA CORPORATION, Anjo (JP)

( * ) Notice: Subject to any disclaimer, the term of this patent is extended or adjusted under 35 U.S.C. 154(b) by 191 days.

(21) Appl. No.: 17/328,506

(22) Filed: May 24, 2021

(65) Prior Publication Data

US 2021/0375124 A1 Dec. 2, 2021

(30) Foreign Application Priority Data

May 27, 2020 (JP) ................ 2020-092195

(51) Int. Cl.
*G08C 17/02* (2006.01)
*H04W 8/24* (2009.01)

(52) U.S. Cl.
CPC .............. *G08C 17/02* (2013.01); *H04W 8/24* (2013.01); *G08C 2201/50* (2013.01); *G08C 2201/70* (2013.01)

(58) Field of Classification Search
CPC ................ G08C 17/02; G08C 2201/50; G08C 2201/70; H04W 8/24
See application file for complete search history.

(56) References Cited

U.S. PATENT DOCUMENTS

| | | | |
|---|---|---|---|
| 9,467,862 B2 | 10/2016 | Zeiler et al. | |
| 9,949,075 B2 | 4/2018 | Burch et al. | |
| 2014/0240125 A1* | 8/2014 | Burch | B25H 3/02 340/539.13 |
| 2019/0160646 A1* | 5/2019 | Hoossainy | H04W 64/003 |
| 2019/0394428 A1 | 12/2019 | Nam | |

OTHER PUBLICATIONS

Oct. 22, 2021 Extended Search Report issued in European Patent Application No. 21175904.8.
Feb. 20, 2024 Notice of Decision of Refusal issued in Japanese Patent Application No. 2020-092195.
Dec. 12, 2023 Notice of Reasons for Refusal issued in Japanese Patent Application No. 2020-092195.

* cited by examiner

*Primary Examiner* — Elton Williams
(74) *Attorney, Agent, or Firm* — Oliff PLC

(57) ABSTRACT

A communication device in one aspect of the present disclosure includes a storage, a first wireless communication circuit, an information obtaining circuit, and a storing processing circuit. The first wireless communication circuit receives first information through an antenna. The first information is wirelessly transmitted from a first transmission device. The first information corresponds to the first transmission device. The first transmission device is configured to be connected to an electric work machine or is connected to the electric work machine. The information obtaining circuit obtains the first information through the first wireless communication circuit in response to a first event being occurred or having occurred. The storing processing circuit stores the first information from the information obtaining circuit into a storage.

21 Claims, 7 Drawing Sheets

COMMUNICATION DEVICE, COMMUNICATION SYSTEM, AND COMMUNICATION METHOD

CROSS-REFERENCE TO RELATED APPLICATIONS

This application claims the benefit of Japanese Patent Application No. 2020-092195 filed on May 27, 2020 with the Japan Patent Office, the entire disclosure of which is incorporated herein by reference.

BACKGROUND

The present disclosure relates to a technique of processing information that is wirelessly transmitted from a transmission device connected to an electric work machine.

U.S. Pat. No. 9,949,075 discloses a tool-monitoring system that remotely monitors a tool used at a job-site. In this tool-monitoring system, a wireless communicator periodically scans tool information that is transmitted from the tool. The wireless communicator receives the tool information and transmits the same to a server.

SUMMARY

U.S. Pat. No. 9,949,075 does not specifically disclose a timing at which the wireless communicator scans the tool information. A lower frequency of scan may result in decrease in monitoring accuracy. A higher frequency of scan results in increase in power consumption of the wireless communicator. In this manner, it is difficult to efficiently manage the tool if a scan frequency is not properly set.

In one aspect of the present disclosure, it is desirable to efficiently manage an electric work machine.

A communication device in one aspect of the present disclosure includes a storage, a first wireless communication circuit, an information obtainer (or an information obtaining circuit), and/or a storing processor (or a storing processing circuit).

The first wireless communication circuit is provided with an antenna. The first wireless communication circuit receives first information through the antenna. The first information corresponds to a first transmission device (or the first information is related to or associated with the first transmission device). The first information is wirelessly transmitted from the first transmission device every time a transmission timing arrives in the first transmission device. The first transmission device is configured to be connected to an electric work machine or is connected to the electric work machine. The information obtainer obtains the first information through the first wireless communication circuit in response to a first event occurring or having occurred. The first event corresponds to an event to confirm whether the first information is to be received. The storing processor stores the first information from the information obtainer, into the storage.

In the aforementioned communication device, every time the first event occurs, if the first information is received by the first wireless communication circuit, then such first information is stored in the storage. Receipt of the first information may indicate, for example, that the first transmission device exists within a specified area (for example, within an area that enables the first information from the first transmission device to be obtained by the communication device) that includes the communication device. Non-obtaining of the first information may indicate, for example, that the first transmission device does not exist within the specified area.

This enables an administrator of the electric work machine to obtain the first information stored in the storage, to thereby efficiently manage the electric work machine. Specifically, the administrator can, for example, confirm whether the electric work machine is located in proximity to the communication device (for example, within the specified area) in real time or subsequently at a timing when the first event occurs.

The first transmission device may be connected to the electric work machine in any manner. The first transmission device may be attached to the electric work machine with, for example, an attachment tool. The first transmission device may be, for example, detachably attached to the electric work machine. In this case, the first transmission device may be, for example, electrically connected to the electric work machine in response to attachment of the first transmission device to the electric work machine and released from electrical connection to the electric work machine in response to detachment of the first transmission device from the electric work machine. The first transmission device may be, for example, incorporated into the electric work machine.

The transmission timing of the first information in the first transmission device may be any timing. The transmission timing may periodically arrive, for example.

The information obtainer may obtain the first information specifically at any timing in response to the first event occurring or having occurred. The information obtainer may obtain the first information through the first wireless communication circuit at a time when the first event occurs, for example. The information obtainer may obtain the first information through the first wireless communication circuit within a specified time period that includes the time when the first event occurs, for example. A start of the specified time period may be, for example, the time when the first event occurs. In a case where the first transmission device is configured to periodically transmit the first information at a constant transmission cycle, a duration of the specified time period may be, for example, equal to the transmission cycle or longer. More specifically, the duration of the specified time period may be, for example, three times or longer of the transmission cycle.

The first information may include any information that corresponds to the first transmission device. The first information may include, for example, information stored in the first transmission device. The first information may include, for example, information relating to the electric work machine to which the first transmission device is connected.

The electric work machine may be configured to operate with an electric power. The electric work machine may include a motor, for example. The electric work machine may be configured such that a rotational driving force of the motor drives a driven member, whereby the driven member is applied to a work target. The driven member may be, for example, a bit, an impeller wheel of a fan, a rotational blade, or a serration.

The first event may include an event in which a confirmation request is made to the communication device. The confirmation request may request for a confirmation on whether the first information is to be received.

In the aforementioned communication device, the first information, which is received by the first wireless communication circuit, is obtained in response to the communication device receiving the confirmation request. This enables the administrator to confirm whether the first information is stored in the storage in response to the confirmation request, to thereby more efficiently manage the electric work machine. Here, "obtaining of the first information received by the first wireless communication circuit" specifically means that, if the first information is received by the first wireless communication circuit, then the received first information is obtained by the information obtainer.

The communication device may further include a user interface. The user interface may receive a request manipulation made by a user of the communication device. The request manipulation may request for a confirmation on whether the first information is to be received. The confirmation request may be made to the communication device in response to the user interface receiving or having received the request manipulation.

The aforementioned communication device enables the administrator to easily confirm, at any timing, whether the first information is to be received by the communication device. The request manipulation may include any manipulation. The request manipulation may include, for example, a manual manipulation by the user.

The communication device may further include a second wireless communication circuit that is configured to receive a radio wave. The radio wave may include a confirmation command. The confirmation command may command the communication device to confirm whether the first information is to be received. The confirmation request may be made to the communication device in response to the second wireless communication circuit receiving or having received the confirmation command.

In the aforementioned communication device, the first information, which is received by the first wireless communication circuit, is obtained in response to the second wireless communication circuit receiving or having received the confirmation command. This enables the administrator to use the confirmation command, to thereby easily confirm, at any timing, whether the first information is to be received by the communication device.

The confirmation command may be transmitted from anywhere. The confirmation command may be transmitted, at any timing, from a first information processor or a second information processor to be described below, for example.

The communication device may further include a second wireless communication circuit, an querier (or a query circuit), and/or a response obtainer (or response obtaining circuit). The second wireless communication circuit transmits and receives a radio wave. The querier makes a query, via the second wireless communication circuit, to the first information processor whether a receipt confirmation of the first information is required. The first information processor is independent from the communication device. The first information processor may be separated from the communication device. The receipt confirmation corresponds to the confirmation on whether first information is to be received. The response obtainer obtains, via the second wireless communication circuit, a response transmitted from the first information processor in response to the query. The confirmation request is made to the communication device in response to the response obtained by the response obtainer indicating that the receipt confirmation of the first information is required.

In the aforementioned communication device, the receipt confirmation of the first information is performed in response to the response made from the first information processor to the query to the first information processor. This enables the administrator to efficiently manage the electric work machine even under the circumstance where a device, which is separated from the communication device, has a difficulty in actively transmitting the aforementioned confirmation command or the like to the communication device.

The first event may include an event in which a confirmation timing arrives. In such a communication device, the first information, which is received by the first wireless communication circuit, is obtained in response to the confirmation timing arriving or having arrived. This enables the administrator to easily obtain information on whether the first information is received on a basis of every confirmation timing. As a result, the administrator can more easily manage the electric work machine.

The communication device may further include an operation setter (or an operation setting circuit). The operation setter may alternatively set a confirmation operation of the information obtainer to enabled or disabled. The confirmation operation may include obtaining the first information, which is received by the first wireless communication circuit, in response to the confirmation timing arriving or having arrived. The information obtainer may obtain the first information through the first wireless communication circuit (that is, the information obtainer may execute the confirmation operation) in response to (i) the confirmation operation being set to enabled and (ii) the confirmation timing arriving or having arrived. The information obtainer may stop (or avoid) obtaining the first information through the first wireless communication circuit in response to (i) the confirmation operation being set to disabled and (ii) the confirmation timing arriving or having arrived.

In the aforementioned communication device, if the confirmation operation is set to disabled, then the information obtainer stops obtaining the first information even if the confirmation timing is arriving or has arrived. In other words, if the confirmation operation is set to disabled, then the first information is not obtained by the information obtainer even if the first information is received by the first wireless communication circuit. This enables the administrator to efficiently manage the electric work machine as needed. The confirmation timing may be any timing. The confirmation timing may periodically arrive, for example. The confirmation timing may be, for example, a preset time or preset time and date.

The communication device may further include a state setter (or a state setting circuit). The state setter may change a state of the communication device from a first state to a second state in response to the first event having occurred for a specified number of times or more in the first state. The information obtainer of the communication device in the second state may stop (or avoid) obtaining the first information from the first wireless communication circuit.

In the aforementioned communication device, the first information, which is received by the first wireless communication circuit, is obtained every time the confirmation timing arrives until the first event occurs for the specified number of times in the first state. In contrast, after the first event has occurred for the specified number of times in the first state, the confirmation operation is not executed even if the confirmation timing is arriving or has arrived. This enables the administrator to inhibit the confirmation operation from being excessively executed. The specified number of times may be one time or any number of times that equals to two times or more.

The state setter may change the state of the communication device to the first state in response to (i) the communication device being set to the second state and (ii) a predetermined setting change condition being fulfilled or having been fulfilled. In such a communication device, even if the state of the communication device is changed to the second state in response to the first event having occurred for the specified number of times or more in the first state, the state of the communication device is changed to the first state if the setting change condition is fulfilled. This enables the administrator to efficiently and continuously manage the electric work machine as needed. The setting change condition may be freely set by the administrator.

The setting change condition may be fulfilled in response to a specified time arriving or having arrived. The specified time may be freely set by the administrator.

The communication device may further include a second wireless communication circuit and/or a transmitter (or a transmission circuit). The second wireless communication circuit may be configured to transmit a radio wave. The transmitter may wirelessly transmit, via the second wireless communication circuit, the first information obtained by the information obtainer to a second information processor. The second information processor may be independent (or separated) from the communication device.

In the aforementioned communication device, the first information, which is received by the communication device, is wirelessly transmitted to the second information processor. This enables the administrator to remotely and efficiently manage the electric work machine based on the first information received by the second information processor. That is, the administrator does not necessarily go to a site where the communication device exists.

The transmitter may transmit the first information to the second information processor at any timing. For example, every time the information obtainer obtains the first information, the transmitter may transmit this first information to the second information processor in real time. For example, the transmitter may transmit the first information, which is stored in the storage, to the second information processor in response to an information transmission timing arriving or having arrived. In this case, the transmitter may, for example, transmit the first information, which has not yet been transmitted to the second information processor, to the second information processor every time the information transmission timing arrives. The second information processor may be one integral information processor with the first information processor. The second information processor may be independent (or separated) from the first information processor. In addition to the first information, the transmitter may transmit additional information, which is different from the first information. The additional information may include, for example, information relating to the communication device (for example, identification information of the communication device or information indicating a location of the communication device). The transmitter may transmit the first information, which is obtained by the information obtainer, to the second information processor as it originally is or with the first information suitably processed. Processing of the first information may be, for example, to reduce a quantity of the first information to be transmitted to the second information processor. Specifically, for example, with respect to the first information required to be transmitted, the transmitter may delete a part of the first information that overlaps with the first information that is previously transmitted to allow transmission of only the rest of the first information, which is distinct from the previously transmitted first information.

The first wireless communication circuit may receive the first information that is wirelessly transmitted in accordance with a first telecommunication method. The second wireless communication circuit may wirelessly transmit the first information in accordance with a second telecommunication method, which is different from the first telecommunication method. The second telecommunication method may be, for example, a cellular mobile wireless telecommunication method.

The first information may include a first identifier and/or a second identifier. The first identifier identifies the first transmission device. The second identifier identifies the electric work machine. In the aforementioned communication device, the first identifier and/or the second identifier, which are/is received by the first wireless communication circuit, are/is obtained in response to the first event occurring or having occurred. This enables the administrator to manage individual electric work machines with enhanced accuracy.

The first identifier may be stored in the first transmission device. The second identifier may be stored in the corresponding first transmission device in advance. The second identifier may be stored in the electric work machine and obtained by the corresponding first transmission device.

The first wireless communication circuit may receive, in addition to the first information, second information that corresponds to (or is associated with) a second transmission device. The second information may be wirelessly transmitted from the second transmission device. In response to the first event occurring or having occurred, the information obtainer may obtain the first information, which is received by the first wireless communication circuit, within a specified time period including a time when the first event occurs.

In the aforementioned communication device, the administrator can efficiently manage individual electric work machines corresponding to each of the first transmission device and the second transmission device. The first wireless communication circuit may further receive the first information that corresponds to and is wirelessly transmitted from each of one or more additional transmission devices. In this case, the administrator can efficiently manage individual electric work machines corresponding to each of the first transmission device, the second transmission device, and the one or more additional transmission devices.

A communication system in another aspect of the present disclosure includes a communication device and/or an information processor. The communication device includes the aforementioned first wireless communication circuit, a second wireless communication circuit configured to transmit a radio wave, the aforementioned information obtainer, and/or the aforementioned transmitter. The information processor obtains the first information that is wirelessly transmitted from the communication device.

The aforementioned communication system can exert the same effect as in the aforementioned communication device.

A communication system in still another aspect of the present disclosure includes a transmission device and/or a communication device. The transmission device may be configured to be connected to an electric work machine or may be connected to the electric work machine. The transmission device may wirelessly transmit first information corresponding to the transmission device every time a transmission timing arrives. The communication device includes the aforementioned storage, the aforementioned wireless communication circuit, the aforementioned information obtainer, and/or the aforementioned storing processor.

The aforementioned communication system can exert the same effect as in the aforementioned communication device.

A communication method in still another aspect of the present disclosure includes:
- obtaining first information through a wireless communication circuit in response to a first event occurring or having occurred, the first event corresponding to an event to confirm whether the first information is to be received by the wireless communication circuit, the first information being wirelessly transmitted from a transmission device every time a transmission timing arrives in the transmission device, and the transmission device being configured to be connected to an electric work machine or being connected to the electric work machine; and/or
- storing the first information in a storage in response to the first information being obtained or having been obtained.

The aforementioned communication method can exert the same effect as in the aforementioned communication device.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
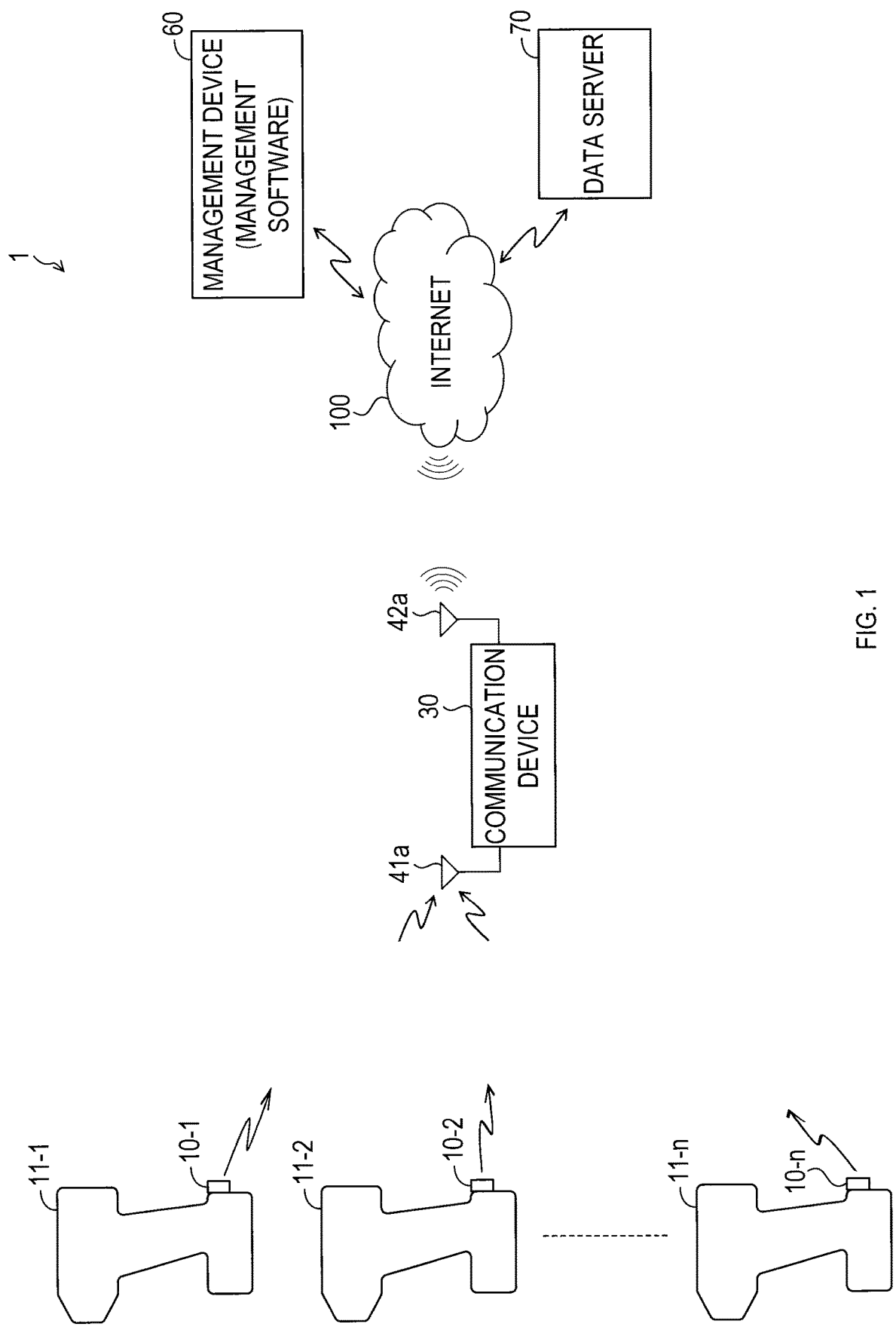
FIG. 1 is an explanatory diagram showing a management system of a first embodiment.

1. First Embodiment (1-1) Overview of Management System

A management system 1 includes a first to an nth (n is a natural number of one or more) transmission terminals 10-1, 10-2, . . . 10-n, a first to an nth electric work machines (for example, electric power tools) 11-1, 11-2, . . . 11-n, and a communication device 30. The management system 1 further includes a management device 60 and/or a data server 70.

In a first embodiment, the management system 1 includes three or more electric work machines and three or more transmission terminals. However, the number of electric work machines and the number of the transmission terminals each may be two.

The first to the nth transmission terminals 10-1, 10-2, . . . 10-n, respectively, are connected to the first to the nth electric work machines 11-1, 11-2, . . . 11-n. Specifically, in the first embodiment, the first transmission terminal 10-1 is connected to the first electric work machine 11-1, the second transmission terminal 10-2 is connected to the second electric work machine 11-2, and the nth transmission terminal 10-n is connected to the nth electric work machine 11-n.

The first transmission terminal 10-1 may be connected to the corresponding first electric work machine 11-1 in any manner. The first transmission terminal 10-1 may be physically connected to the corresponding first electric work machine 11-1. The first transmission terminal 10-1 may or does not necessarily be electrically connected to the corresponding first electric work machine 11-1. The first transmission terminal 10-1 may be attached to the first electric work machine 11-1 with an attachment tool, such as a bundling tie, an adhesive, and or screw component. The first transmission terminal 10-1 may be detachably attached to the first electric work machine 11-1, for example.

The first to the nth electric work machines 11-1, 11-2, . . . 11-n may include respective distinctive device identifiers that are different from one another. Each device identifier corresponds to one example of the second identifier in the present disclosure.

As in the first transmission terminal 10-1, the second to the nth transmission terminals 10-2 to 10-n each may be connected to the corresponding electric work machine in any manner.

Every time a transmission timing arrives, each of the first to the nth transmission terminals 10-1 to 10-n wirelessly transmits information that corresponds to the transmission terminal (hereinafter, referred to as "terminal information") in accordance with a first telecommunications system. The terminal information corresponds to one example of the first information in the present disclosure.

The transmission timing may be any timing. In the first embodiment, the transmission timing periodically arrives at, for example, a first cycle. The first to the nth transmission terminals 10-1 to 10-n may have respective different transmission timings.

The first telecommunications system may be any telecommunications system. In the first embodiment, the first telecommunications system conforms to, for example, a telecommunications standard for Bluetooth Low Energy (hereinafter, referred to as "BLE"). Here, "Bluetooth" is a registered trademark.

The terminal information may include any information. The terminal information may include, for example, information of corresponding one transmission terminal (corresponding transmission terminal). More specifically, the terminal information may include, for example, a terminal identifier that identifies the corresponding transmission terminal. The terminal identifier corresponds to one example of the first identifier in the present disclosure.

The terminal information may include, for example, information relating to the electric work machine that corresponds to the corresponding transmission terminal (that is, the electric work machine connected to the corresponding transmission terminal). More specifically, the terminal information may include, for example, the above-described device identifier of the electric work machine.

The first to the nth electric work machines 11-1 to 11-n are configured to operate with an electric power to thereby operate. At least one of the first to the nth electric work machines 11-1 to 11-n may include a motor, for example, and configured such that a rotational driving force of the motor drives a driven member, whereby the driven member is applied to a work target. The driven member may be, for example, a bit, an impeller wheel of a fan, a rotational blade, or a serration. The first to the nth electric work machines 11-1 to 11-n are of the same model or of different models from one another.

Figure 7:
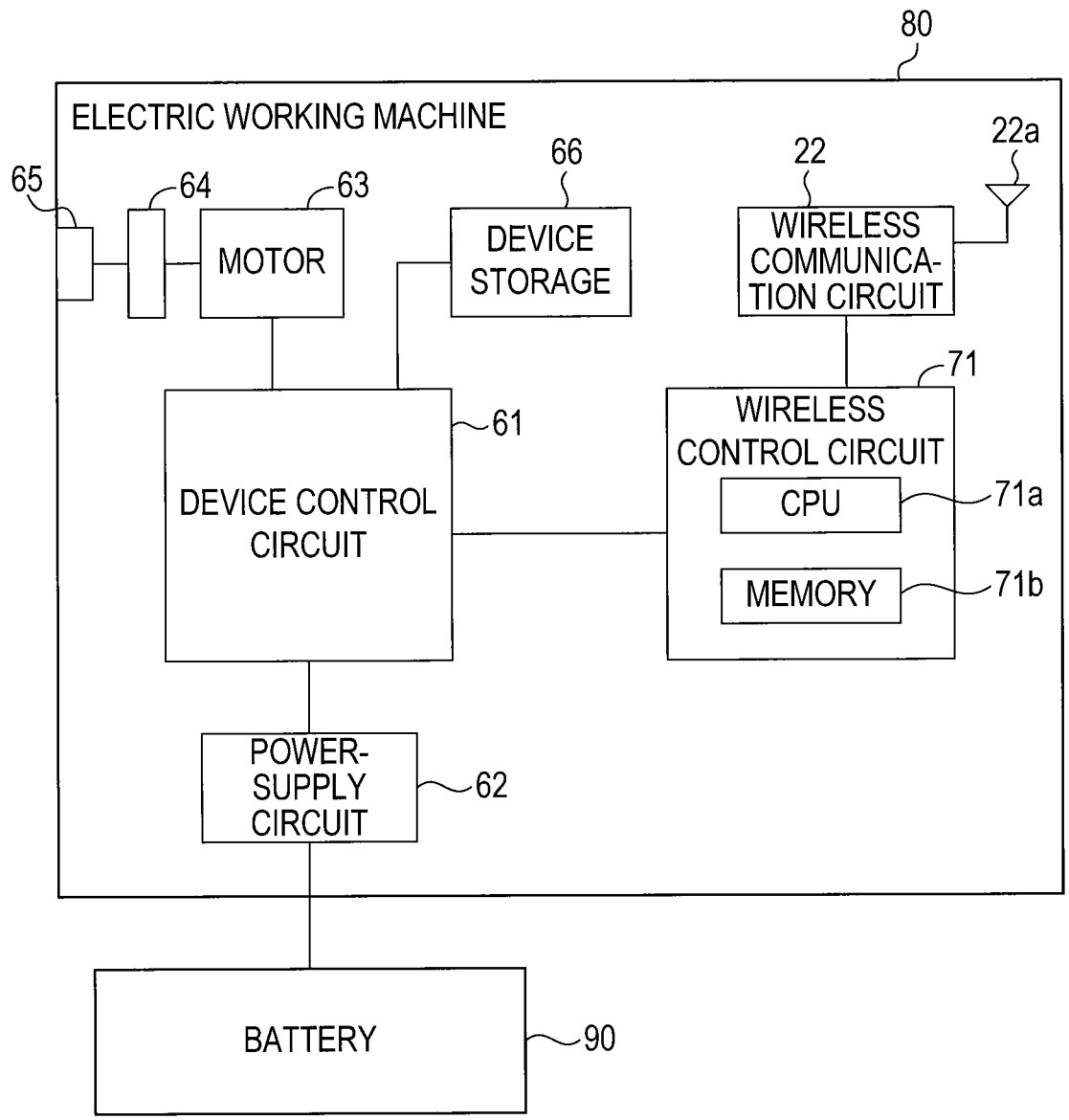
FIG. 7 is a block diagram showing an example of an electric work machine.

Specific configurations of the first to the nth electric work machines 11-1 to 11-n are substantially the same as an electric work machine 80, which is shown in FIG. 7 and described below, except that a wireless communication circuit 22, a first antenna 22a, and a wireless control circuit 71 are omitted.

The communication device 30 includes a first antenna 41a and a second antenna 42a. The communication device 30 receives the terminal information, which is transmitted from each of the first to the nth transmission terminals 10-1 to 10-n, through the first antenna 41a. Specifically, the communication device 30 can receive the terminal information from at least one of the first to the nth transmission terminals 10-1 to 10-n that is located within a communicable distance from the communication device 30 (specifically, a distance from the first antenna 41a). The communication device 30 cannot receive the terminal information from at least one of the first to the nth transmission terminals 10-1 to 10-n that is located out of the communicable distance from the communication device 30. The communicable distance may vary depending on the first to the nth transmission terminals 10-1 to 10-n. Respective communicable distances of the first to the nth transmission terminals 10-1 to 10-n may vary depending on an environment between the corresponding transmission terminal and the communication device 30, characteristics of the first antenna 22a of the corresponding transmission terminal (for example, directivity, gain, polarization), and the like.

The communication device 30 may be arranged at, for example, a job-site where the first to the nth electric work machines 11-1 to 11-n are to be used.

The communication device 30 is communicable with the management device 60 and/or the data server 70 through a network. In the first embodiment, the network includes, for example, the Internet 100.

The communication device 30 may be connected to the Internet 100 by any method. In the first embodiment, the communication device 30 is connected to, for example, a cellular mobile telecommunications network and then to the Internet 100 via the mobile telecommunications network. In the first embodiment, the communication device 30 can perform a wireless communication in accordance with a second telecommunications system. The second antenna 42a transmits and receives a radio wave in accordance with the second telecommunications system. The communication device 30 is connected to the mobile telecommunications network through the second telecommunications system.

The mobile telecommunications network may be configured to allow mobile telecommunications in conformity with any telecommunications standard. The mobile telecommunications network may be configured to allow, for example, mobile telecommunications in conformity with a telecommunications standard for Long Term Evolution (LTE), or to allow, for example, mobile telecommunications in conformity with a mobile telecommunications standard for one of various generations, which are also referred to as the fourth generation (4G), the fifth generation (5G), or the like. Furthermore, the mobile telecommunications network may be configured, for example, to allow mobile telecommunications based on LTE category M1. The LTE category M1 is one of Low Power, Wide Area (LPWA), which is one of wireless communication technology for Internet of Things (IoT).

The communication device 30 wirelessly transmits (or uploads) job-site management information to (or on) the data server 70 through the second telecommunications system. The job-site management information may include the terminal information that is received by the communication device 30. The job-site management information may include device identification information that identifies the communication device 30.

In response to receipt of the job-site management information uploaded by the communication device 30, the data server 70 saves the received job-site management information.

The management device 60 may be communicable with the data server 70. The management device 60 may specifically be, for example, an information processor, such as a personal computer, a smartphone, or a tablet computer.

The management device 60 includes a function to manage (or control, administer, or monitor) the first to the nth electric work machines 11-1 to 11-n. Specifically, the management device 60 has a management software installed, the management software being designed to provide a management function. The management software is not limited to a software that is installed in the management device 60 for use. The management software may be, for example, a Web application that is operated on a Web browser. The management function provided by the management software may include, for example, a function to obtain the job-site management information from the data server 70 and then to show the obtained job-site management information on a display, which is not illustrated. The management function may include a function to transmit a scan command, which will be described below, to the communication device 30 in response to a transmission command by an administrator.

The administrator uses the management software in the management device 60, to thereby allow management of the first to the nth electric work machines 11-1 to 11-n. Specifically, the administrator can confirm whether the first to the nth electric work machines 11-1 to 11-n exist at the job-site where the first to the nth electric work machines 11-1 to 11-n are to be used. The administrator and a user of the communication device 30 may be the same or different.

The administrator enables the scan command, which is for commanding execution of a scan function to be described below, to be transmitted from the management device 60 to the communication device 30.

Each of the first to the nth transmission terminals 10-1 to 10-n and corresponding one electric work machine are associated with each other. Specifically, for example, the data server 70 may have a first management table created to indicate a corresponding relation between each transmission terminal and corresponding one electric work machine. In the first management table, for example, the terminal identifier of each transmission terminal and the device identifier of the electric work machine, which corresponds to the transmission terminal, may be associated.

The job-site, where the first to the nth electric work machines 11-1 to 11-n are to be used, may have a device storage arranged to accommodate the first to the nth electric work machines 11-1 to 11-n. The communication device 30 may be provided to this device storage. The communication device 30 may be arranged inside the device storage.

For example, the device storage may be made of metal, in other words, may be assembled with a material that contains metal and configured such that a radio wave from outside of the device storage is not propagated or unlikely to be propagated into the device storage. In this case, the administrator can confirm whether the first to the nth electric work machines 11-1 to 11-n are stored in the device storage. For example, the administrator notifies an operator to store the first to the nth electric work machines 11-1 to 11-n in the device storage at the end of a day's operation, whereby the administrator can manage existence of the first to the nth electric work machines 11-1 to 11-n on a daily basis.

If the communication device 30 is arranged inside the device storage, which is made of metal, the communication device 30 may be arranged such that the second antenna 42a can transmit a radio wave to the outside of the storage device and receive a radio wave from the outside of the storage device. Specifically, for example, the communication device 30 may be arranged inside the device storage such that the second antenna 42a is exposed to the outside of the device storage. Furthermore, a part of an outer surface of the device storage may be provided with an area that allows the radio wave to pass through and the second antenna 42a may be arranged in such an area, for example.

The communication device 30 may be arranged, for example, inside a vehicle that carries the first to the nth electric work machines 11-1 to 11-n to the job-site. In this case, the administrator can efficiently manage the first to the nth electric work machines 11-1 to 11-n to be used at the job-site.

(1-2) Configurations of First to Nth Transmission Terminals 10-1 to 10-n

Specific configurations of the first to the nth transmission terminals 10-1 to 10-n are described with reference to FIG. 2. In the first embodiment, the first to the nth transmission terminals 10-1 to 10-n are configured basically similarly to each other except the terminal identifiers. Therefore, description will be given herein to the first to the nth transmission terminal 10-1 as a representative example. The first to the nth transmission terminals 10-1 to 10-n may be of the same model or may include transmission terminals of different models from each other.

Figure 2:
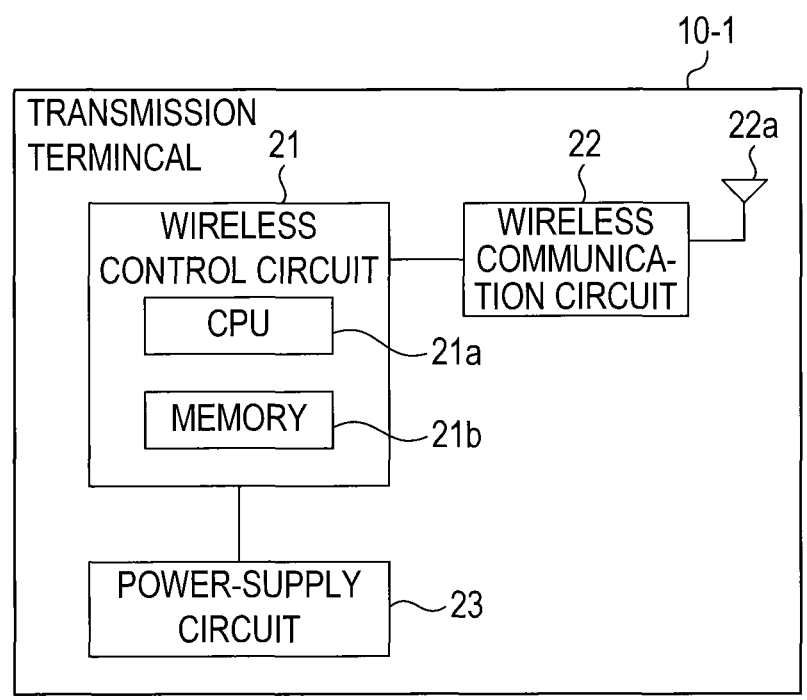
FIG. 2 is a block diagram of a transmission terminal of the first embodiment.

As shown in FIG. 2, the first transmission terminal 10-1 includes a wireless control circuit 21, the wireless communication circuit 22, and a power-supply circuit 23. The wireless communication circuit 22 includes the first antenna 22a.

The wireless communication circuit 22 performs a wireless communication in accordance with the first telecommunications system. Specifically, the wireless communication circuit 22 transmits a radio wave from the first antenna 22a in accordance with the first telecommunications system. The wireless communication circuit 22 may include a function to receive a radio wave.

The power-supply circuit 23 supplies an electric power to the wireless control circuit 21 and the wireless communication circuit 22. The wireless control circuit 21 and the wireless communication circuit 22 operate with the electric power that is supplied from the power-supply circuit 23. The power-supply circuit 23 may be configured in any manner. For example, the power-supply circuit 23 may include a battery and may be configured to supply an electric power of the battery. The power-supply circuit 23 may include a conversion circuit that converts a voltage of the battery. The voltage converted by the conversion circuit may be applied to the wireless control circuit 21 and the wireless communication circuit 22.

The wireless control circuit 21 includes, for example, a CPU 21a and a memory 21b. The memory 21b stores various programs in order for a function of the wireless control circuit 21 to be achieved. The CPU 21a executes a program stored in the memory 21b, to thereby achieve the function of the wireless control circuit 21. The above-described terminal information may be stored in the memory 21b.

The function of the wireless control circuit 21 includes the above-described function to transmit the terminal information every time the transmission timing arrives. Specifically, the wireless control circuit 21 wirelessly transmits the terminal information via the wireless communication circuit 22 in response to an arrival of the transmission timing.

(1-3) Configuration of Communication Device

A specific configuration of the communication device 30 is described with reference to FIG. 3. The communication device 30 includes a control circuit 31, a first wireless communication circuit 41, and a second wireless communication circuit 42.

The first wireless communication circuit 41 performs the wireless communication in accordance with the above-described first telecommunications system. Specifically, the first wireless communication circuit 41 receives the terminal information that is wirelessly transmitted from each of the first to the nth transmission terminals 10-1, 10-2, . . . 10-n.

The second wireless communication circuit 42 transmits and receives a radio wave in accordance with the above-described second telecommunications system. The second telecommunications system in the present embodiment is, for example, inconformity with the communication standard that is used for a mobile communication network, such as the above described LTE, 4G, and 5G.

The communication device 30 further includes a power-supply circuit 33. The communication device 30 may further include a user interface 32 and/or a Global Positioning System (GPS) receiver 34.

The user interface 32 receives various input manipulations by the user. The user interface 32 includes a scan button 32a. The scan button 32a is pressed by the user. The user presses the scan button 32a, to thereby request for a confirmation on whether the terminal information is received by the first wireless communication circuit 41. Pressing the scan button 32a corresponds to one example of the request manipulation in the present disclosure.

The user interface 32 may include a display device. The display device may include, for example, a liquid crystal display, an organic electroluminescence (EL) display, or the like. The terminal information received by the communication device 30 may be displayed on the display device.

The power-supply circuit 33 supplies an electric power to the control circuit 31, the first wireless communication circuit 41, the second wireless communication circuit 42, the GPS receiver 34 and/or the user interface 32. The control circuit 31, the first wireless communication circuit 41, the second wireless communication circuit 42, the GPS receiver 34 and/or the user interface 32 operate with the electric power that is supplied from the power-supply circuit 33.

The power-supply circuit 33 may be configured in any manner. The power-supply circuit 33 may, for example, include a battery and be configured to supply an electric power of the battery. The power-supply circuit 33 may include a conversion circuit that converts a voltage of the battery and output the voltage converted by conversion circuit. The communication device 30 may be attachable to and detachable from a not shown battery, which is separated from the communication device 30. The power-supply circuit 33 may receive an electric power from the battery attached to the communication device 30 and supply the electric power to a target to be powered. The power-supply circuit 33 may be configured to supply respective different voltages to the control circuit 31, the first wireless communication circuit 41, and the like.

The GPS receiver 34 receives a GPS signal that is transmitted from a not shown GPS satellite and outputs the received GPS signal to the control circuit 31.

The control circuit 31 includes a microcomputer that is provided with, for example, a CPU 31a, a memory 31b, and the like. The memory 31b includes at least one of various semiconductor memories, such as a RAM, a ROM, and a flash memory. The CPU 31a executes a program stored in a non-transitory tangible storage medium, to thereby achieve various functions of the control circuit 31, which include a scan function to be described below. In the present embodiment, the memory 31b corresponds to the non-transitory tangible storage medium that stores the program. As a result of execution of the program, a method corresponding to this program is executed. Here, the control circuit 31 may include one microcomputer or two or more microcomputers.

A procedure to achieve the various functions of the control circuit 31 is not limited to a software. Some of or the entirety of the various functions may be achieved by one hardware or two or more hardware. For example, in a case where the aforementioned various functions are achieved by an electronic circuit, which is a hardware, such an electronic circuit may be achieved by a digital circuit that includes multiple logic circuits, an analog circuit, or a combination of these.

In the first embodiment, the memory 31b stores a program for a communication process, which is described below. The CPU 31a receives supply of an electric power, to thereby be activated. In response to the activation, the CPU 31a reads the program for the communication process stored in the memory 31b, to thereby execute the communication process.

The control circuit 31 includes the scan function. The scan function is included in the communication process. In the scan function, the control circuit 31 scans the terminal information that is transmitted from each of the first to the nth transmission terminals 10-1 to 10-n. More specifically, in the scan function, the control circuit 31 confirms whether the first wireless communication circuit 41 receives the terminal information transmitted from each of the first to the nth transmission terminals 10-1 to 10-n.

The control circuit 31 (specifically, the CPU 31a) executes the scan function in response to an occurrence of an event (hereinafter, referred to "scan request event") that requires an execution of the scan function. The control circuit 31, which has executed the scan function, obtains the terminal information received in the first wireless communication circuit 41 in response to the execution of the scan function. Then, the control circuit 31 stores the received terminal information in the memory 31b.

The scan request event may include receiving a confirmation request by the communication device 30. The confirmation request requests for a confirmation on whether the terminal information is received.

In the first embodiment, the confirmation request may include, for example, pressing the scan button 32a by the user.

The confirmation request may further include, for example, receiving a scan command from the management device 60 via the second wireless communication circuit 42. The scan command commands the communication device 30 to confirm whether the terminal information is received. In other words, the scan command commands the communication device 30 to execute the scan function. The scan command corresponds to one example of the confirmation command in the present disclosure.

The scan request event may further include, for example, an arrival of an automatic scan timing. Specifically, the control circuit 31 may execute the scan function every time the automatic scan timing arrives. The automatic scan timing may be changed in any setting by the user. A manipulation for changing a setting of the automatic scan timing by the user may be performed, for example, via the user interface. Hereinafter, executing the scan function every time the automatic scan timing arrives is referred to as "automatic scan". The automatic scan corresponds to one example of the confirmation operation in the present disclosure and the automatic scan timing corresponds to one example of the confirmation timing in the present disclosure.

The automatic scan timing may be any timing. The automatic scan timing may periodically arrive, for example. The automatic scan timing may be, for example, a set time or set time and date.

The user can alternatively set the automatic scan to enabled or disabled. The setting may be performed by any method. The setting may be performed, for example, via the user interface 32. The setting may be remotely manipulated by a separate information processor from the communication device 30 (for example, the management device 60 or a smartphone, a personal computer, or a tablet computer of the user).

The control circuit 31 executes the scan function in response to the automatic scan being set to enabled and the automatic scan timing arriving. In a case where the automatic scan is set to disabled, the control circuit 31 does not execute the automatic scan even in response to an arrival of the automatic scan timing. That is, the control circuit 31 avoids executing the automatic scan in a case where the automatic scan is set to disabled.

Every time the scan request event occurs, the control circuit 31 executes a receipt confirmation on whether the terminal information is received by the first wireless communication circuit 41. A timing or a time period for executing the receipt confirmation (hereinafter, referred to as "scan period") may be any timing or any time period.

The scan period may be, for example, a time when the scan request event occurs. The scan period may be, for example, within a specified time period that includes a time when the scan request event occurs. A start of the specified time period may be, for example, the time when the scan request event occurs. In the first embodiment, as described above, each of the first to the nth transmission terminals 10-1 to 10-n periodically transmits the terminal information at the first cycle. Thus, a duration of the specified time period may be, for example, equal to or longer than the first cycle. More specifically, the duration of the specified time period may be, for example, three times or longer of the first cycle.

The control circuit 31 may detect a location of the communication device 30 based on the GPS signal from the GPS receiver 34. The control circuit 31 may upload the job-site management information, which includes location information indicating the detected location, on the data server 70.

(1-4) Communication Process

Figure 4:
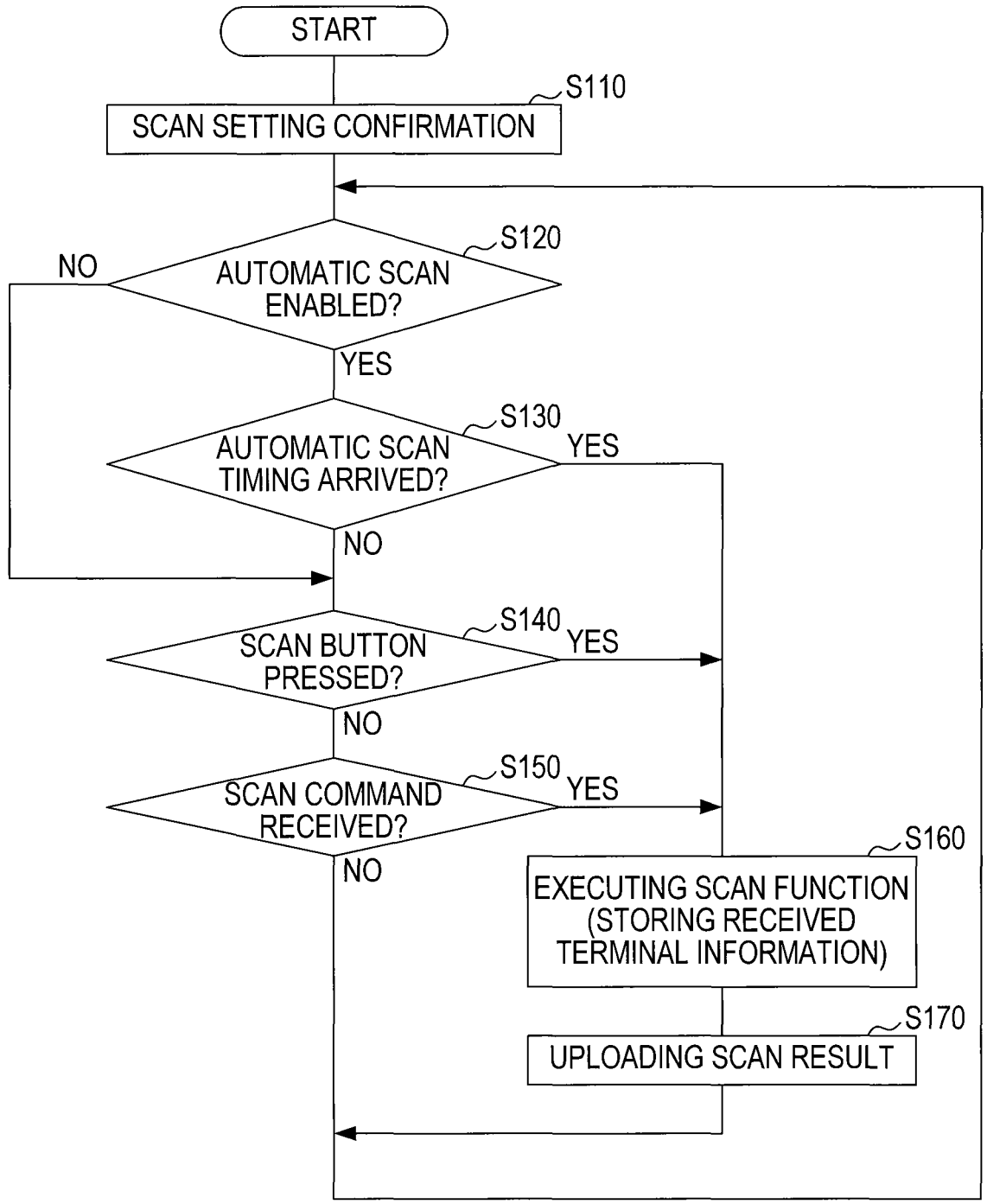
FIG. 4 is a flow chart of a communication process of the first embodiment.

Now, the above-described communication process, which is executed by the control circuit 31, will be described with reference to FIG. 4. The control circuit 31 (specifically, the CPU 31a) confirms the current scan setting in S110 in response to start of the communication process. The scan setting includes a set value of enablement or disablement of the automatic scan and the automatic scan timing.

In S120, the control circuit 31 determines whether the automatic scan is set to enabled. If the automatic scan is set to disabled, then the present process proceeds to S140. If the automatic scan is set to be enabled, then the present process proceeds to S130.

In S130, the control circuit 31 determines whether the automatic scan timing arrives. If the automatic scan timing arrives, then the present process proceeds to S160. In S160, the control circuit 31 executes the scan function. Furthermore, in S160, the control circuit 31 stores, in the memory 31b, the terminal information that is received as a result of the scan function. The terminal information received in S160 is transmitted from, for example, the transmission terminal that is located within the above-described communicable distance from the communication device 30.

In S170, the control circuit 31 uploads a scan result on the data server 70. Specifically, the control circuit 31 uploads the job-site management information, which includes the terminal information received in S160, on the data server 70 via the second wireless communication circuit 42. Subsequent to the process of S170, the present process proceeds to S120.

In S130, if the automatic scan timing is not yet arrived, then the present process proceeds to S140. In S140, the control circuit 31 determines whether the scan button 32a is pressed. If the scan button 32a is pressed, then the present process proceeds to S160. If the scan button 32a is not pressed, then the present process proceeds to S150.

In S150, the control circuit 31 determines whether the scan command is received from the management device 60. If the scan command is received, then the present process proceeds to S160. If the scan command is not received, then the present process proceeds to S120.

(1-5) Effects of the First Embodiment

The above-described first embodiment can bring the following effects (1a) to (1f).

(1a) The communication device 30 executes the scan function every time the scan request event occurs and stores the terminal information, which is received by the first wireless communication circuit 41, in the memory 31b. This enables administrator to obtain the terminal information stored in the memory 31b, to thereby efficiently manage the first to the nth electric work machines 11-1 to 11-n. Specifically, for example, the administrator can confirm whether the first to the nth electric work machines 11-1 to 11-n are located in proximity to the communication device 30 (for example, within a range of the communicable distance from the communication device 30) in real time or subsequently at a timing when the scan request event occurs.

(1b) The communication device 30 uploads the job-site management information, which includes the terminal information, on the data server 70 via the second wireless communication circuit 42. This enables the administrator to efficiently manage the electric work machine from distance based on the job-site management information uploaded on the data server 70. That is, the administrator does not necessarily go to a site where the communication device 30 exists.

(1c) The user or the administrator presses the scan button 32a, to thereby execute the scan function. This enables the administrator to easily confirm, at any timing, whether the first to the nth electric work machines 11-1 to 11-n are located in proximity to the communication device 30.

(1d) The communication device 30 executes the scan function in response to receipt of the scan command from the management device 60. This enables the administrator to easily and remotely manage the first to the nth electric work machines 11-1 to 11-n using the scan command.

(1e) The communication device 30 has an automatic scan function. That is, the communication device 30 executes the scan function every time the automatic scan timing arrives. This enables the administrator to easily obtain information on whether the first to the nth electric work machines 11-1 to 11-n are located in proximity to the communication device 30 on a basis of every automatic scan timing. As a result, the administrator can more easily manage the first to the nth electric work machines 11-1 to 11-n.

(1f) The user can alternatively set the automatic scan to enabled or disabled. During the disablement of the automatic scan, the communication device 30 does not execute the automatic scan even if the automatic scan timing arrives. This enables the administrator to efficiently manage the electric work machine as needed.

In the first embodiment, the memory 31b corresponds to one example of the storage in the present disclosure. Each of the first to the nth transmission terminals 10-1 to 10-n corresponds to one example of the first transmission device or the second transmission device in the present disclosure. The control circuit 31 corresponds to one example of the obtainer, the storing processor, the operation setter, the state setter, and the transmitter in the present disclosure.

2. Second Embodiment

Figure 3:
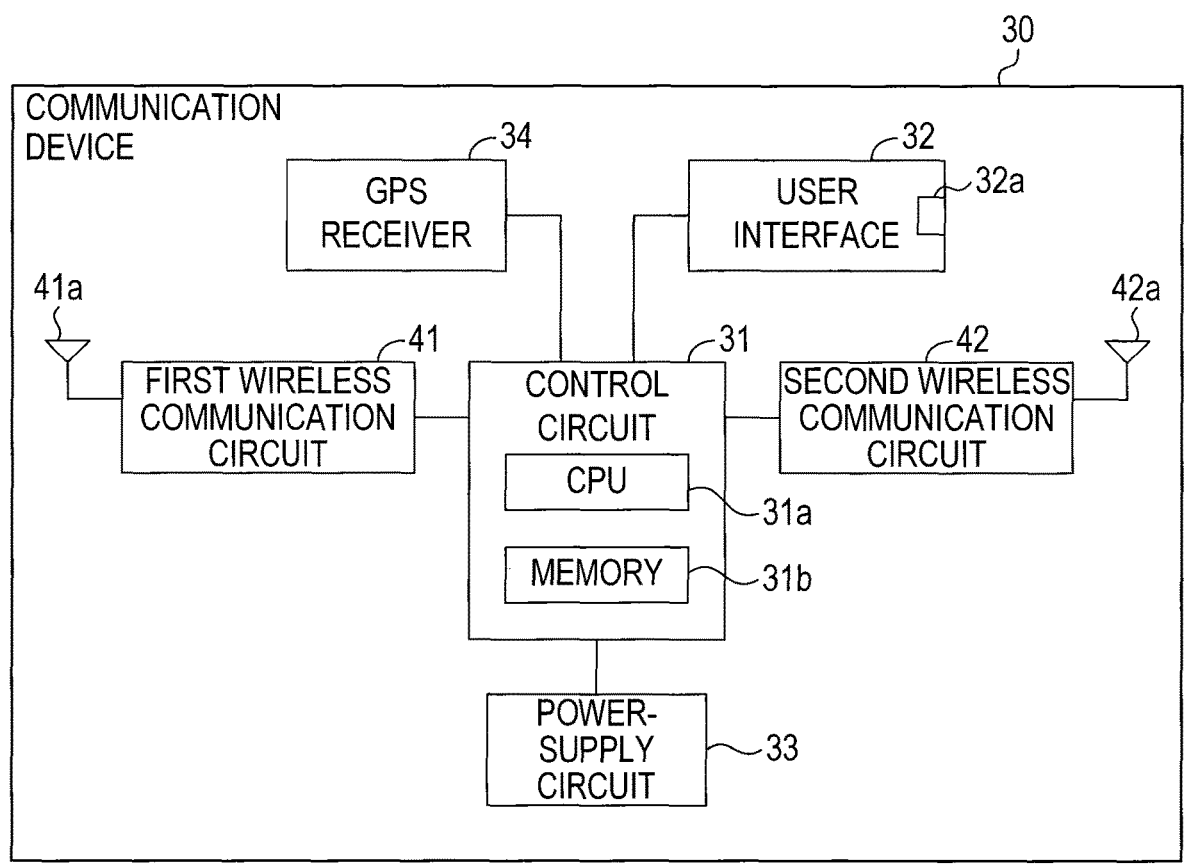
FIG. 3 is a block diagram of a communication device of the first embodiment.

A management system of a second embodiment is basically the same as the management system 1 of the first embodiment shown in FIGS. 1 to 3. The management system of the second embodiment is different from the management system 1 of the first embodiment in respect of the communication process that is executed by the control circuit 31 of the communication device 30.

The control circuit 31 of the second embodiment alternatively sets a scan-done flag to ON or OFF. If the scan-done flag is set to OFF, then the control circuit 31 executes the automatic scan. The control circuit 31 switches the scan-done flag OFF from ON and thereafter executes a specified number of scan functions. In response to this, the control circuit 31 switches the scan-done flag ON.

The specified number of scan functions may be one or two or more. In the second embodiment, the specified number of scan functions is one, for example. The specified number of scan functions may be changeable by the user. A state in which the scan-done flag is set to OFF corresponds to one example of the first state in the present disclosure. A state in which the scan-done flag is set to ON corresponds to one example of the second state in the present disclosure.

While the scan-done flag is set to ON, the control circuit 31 does not execute the automatic scan even if the automatic scan timing arrives. The control circuit 31 switches the scan-done flag OFF in response to fulfillment of a flag-OFF condition while the scan-done flag is turned ON.

The flag-OFF condition may be any condition. In the second embodiment, the flag-OFF condition is fulfilled when, for example, the date changes, in other words, when the time is 12:00 AM. The flag-OFF condition may be changeable by the user. The flag-OFF condition corresponds to one example of the setting change condition in the present disclosure. The time 12:00 AM, at which the flag-OFF condition is fulfilled, corresponds to one example of the specified time in the present disclosure.

Figure 5:
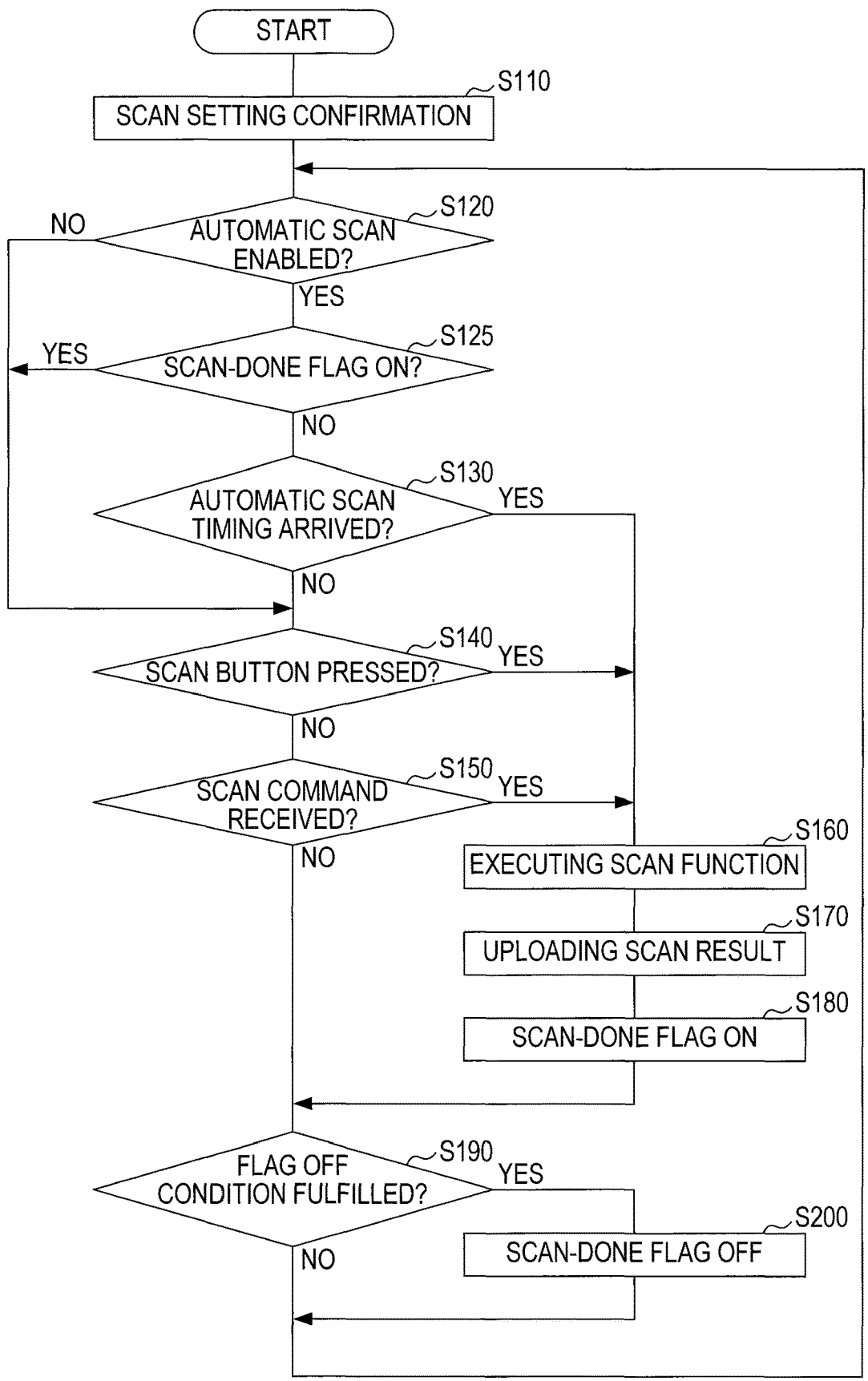
FIG. 5 is a flow chart of a communication process of a second embodiment.

The communication process of the second embodiment that achieves the above-described function is as shown in FIG. 5. In FIG. 5, the same process(es) as in FIG. 4 is/are denoted with the same reference numeral(s). Descriptions are given to the communication process shown in FIG. 5 in respect of its differences from the communication process of the first embodiment.

As shown in FIG. 5, in the communication process of the second embodiment, if the automatic scan is set to enabled in S120, then the present process proceeds to S125. In S125, the control circuit 31 determines whether the scan-done flag is set to ON. The scan-done flag is turned ON in S180 described below.

If the scan-done flag is set to ON in S125, then the present process proceeds to S140. If the scan-done flag is set to OFF in S125, then the present process proceeds to S130.

In the communication process of the second embodiment, the control circuit 31 uploads a scan result on the data server 70 in S170. In response to this, the present process proceeds to S180. In S180, the control circuit 31 sets the scan-done flag to ON. If the specified number of scan functions is set to two or more, then the control circuit 31 disables the process in S180 until the specified number of scan functions is executed in S160, and sets the scan-done flag to ON in S180 in response to the specified number of scan functions being executed in S160. Subsequent to the process in S180, the present process proceeds to S190. If the scan command is not received in S150, then the present process proceeds to S190.

In S190, the control circuit 31 determines whether the flag-OFF condition is fulfilled. If the flag-OFF condition is unfulfilled, then the present process proceeds to S120. If the flag-OFF condition is fulfilled, then the present process proceeds to S200. In S200, the control circuit 31 sets the scan-done flag to OFF. Subsequent to the process in S200, the present process proceeds to S120.

The above-detailed second embodiment brings further effects described below in addition to the above-described effects of the first embodiment. Specifically, the communication device 30 executes the automatic scan in response to the arrival of the automatic scan timing while the scan-done flag is set to OFF. In contrast, in response to the specified number of scan functions being executed (for example, one in the first embodiment), the scan-done flag is set to ON. While the scan-done flag is set to ON, the communication device 30 does not execute the automatic scan even in response to the arrival of the automatic scan timing.

The administrator suitably sets the specified number of scan functions and the flag-OFF condition, whereby the automatic scan can be inhibited from being excessively executed. As a result, the administrator can efficiently manage the first to the nth electric work machines 11-1 to 11-n as needed.

3. Third Embodiment

A management system of a third embodiment is basically the same as the management system of the second embodiment. The management system of the third embodiment is different from the management system of the second embodiment in respect of the communication process that is executed by the control circuit 31 of the communication device 30.

In the third embodiment, the scan request event includes receiving, by the communication device 30, a first response from the data server 70 with respect to a polling relating to scan necessity/unnecessity (hereinafter, simply referred to as "polling") that is transmitted from the communication device 30 to the data server 70. The first response indicates that the receipt confirmation on the terminal information is required. Receipt of the first response corresponds to one example of the above-described confirmation request.

The polling is a process to make a query, to the data server 70 via the second wireless communication circuit, on whether the receipt confirmation on the terminal information is required.

The data server 70 sets a scan-required flag to ON or OFF. In response to receipt of the polling, the data server 70 transmits a response, which is based on the set scan-required flag, to the communication device 30.

Specifically, in response to receipt of the polling, the data server 70, in which the scan-required flag is set to ON, transmits the first response. In response to receipt of the polling, the data server 70, in which the scan-required flag is set to OFF, transmits a second response. The second response indicates that the receipt confirmation on the terminal information is not required.

The scan-required flag can be set in the data server 70 or by a separate information processor (for example, the management device 60) from the data server 70.

Figure 6:
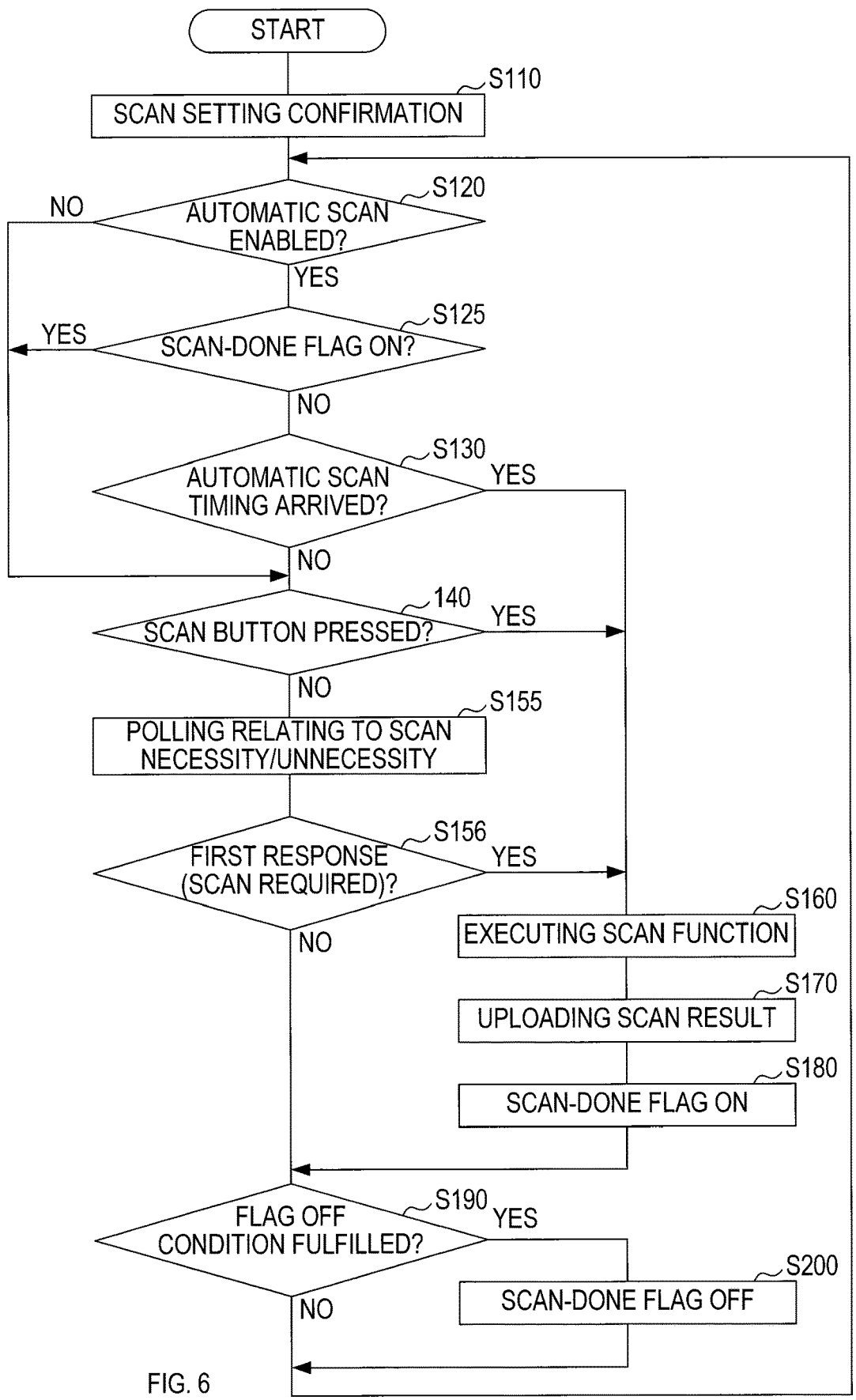
FIG. 6 is a flow chart of a communication process of a third embodiment.

The communication process of the third embodiment that achieves the above-described functions is as shown in FIG. 6. In FIG. 6, the same process(es) as in FIG. 5 is/are denoted with the same reference numeral(s). Descriptions are given to the communication process shown in FIG. 6 in respect of its differences from the communication process of the second embodiment.

As shown in FIG. 6, in the communication process of the third embodiment, if the scan button 32a is not pressed in S140, then the present process proceeds to S155. In S155, the control circuit 31 executes the polling with respect to the data server 70.

In S156, the control circuit 31 determines whether the response from the data server 70 with respect to the polling is the first response or the second response. If the response is the first response, then the present process proceeds to S160. If the response is the second response, then the present process proceeds to S190.

The above-detailed third embodiment further brings an effect described below in addition to the above-described effects of the second embodiment. Specifically, the administrator suitably sets the scan-required flag in the data server 70, to thereby enable efficient management of the first to the nth electric work machines 11-1 to 11-n as needed.

In the third embodiment, the management device 60 may remove the function to transmit the scan command. According to the management system of the third embodiment, even if the management device 60 does not include the function to transmit the scan command, the administrator can manage the electric work machine(s) in the same manner as in a case where the management device 60 includes the function to transmit the scan command.

Specifically, even if the management device 60 does not include the function to transmit the scan command, the administrator sets the scan-required flag in the data server 70 to ON as needed, to thereby enable suitable management of the electric work machine(s).

4. Other Embodiments

Although embodiments of the present disclosure have been described above, the present disclosure is not limited to the above-described embodiments and may be practiced in various forms.

(4-1) The control circuit 31 does not necessarily upload the job-site management information every time the control circuit 31 executes the scan function. The control circuit 31 may upload job-site management information, which includes terminal information stored in the memory 31*b*, but still remains untransmitted, in response to an arrival of a specified information transmission timing, for example.

Furthermore, the communication device 30 may include a media interface, such as an USB interface, to which a storage media can be connected. And, the communication device 30 can output the terminal information, which is stored in the memory 31*b*, to the storage media via the media interface.

(4-2) An upload destination of the job-site management information is not limited to the data server 70. For example, the job-site management information may be uploaded on the management device 60.

(4-3) The first telecommunications system may be different from the BLE. The first telecommunications system may be, for example, a wireless LAN or a near-field wireless communication system that is different from the BLE. The second telecommunications system may be any telecommunications system. The second telecommunications system may be, for example, a wired communication system. Specifically, for example, the communication device 30 of the first embodiment (see, FIG. 3) may be provided with a wired communication interface to be connected to a wired communication network (for example, a LAN) in replacement of or in addition to the second wireless communication circuit 42. And, the communication device 30 may be connected to the Internet 100 via the wired communication interface and the LAN connected to the wired communication interface. The wired communication interface may be configured to be allowed for direct connection to the Internet 100.

(4-4) The communication device 30 may have any hardware configuration. The communication device 30 may be an information communication device, such as a smartphone, a tablet computer, or the like. In this case, the information communication device may have a program for communication process installed therein, to thereby function as the communication device 30 of each embodiment described above in combination with its own function.

(4-5) The first transmission terminal 10-1 may be detachably attached to the first electric work machine 11-1, for example. In this case, the first transmission terminal 10-1 may be, for example, electrically connected to the first electric work machine 11-1 in response to attachment of the first transmission terminal 10-1 to the first electric work machine 11-1 and released from the electrical connection to the first electric work machine 11-1 in response to removal of the first transmission terminal 10-1 from the first electric work machine 11-1. The first transmission terminal 10-1 may be incorporated into the first electric work machine 11-1, for example. These example embodiments of the first transmission terminal 10-1 are also applied to the second to the nth transmission terminals 10-2 to 10-*n*.

FIG. 7 shows one example of an electric work machine that incorporates therein the first transmission terminal 10-1. An electric work machine 80 shown in FIG. 7 includes a device control circuit 61, a power-supply circuit 62, a motor 63, and a driving mechanism 64. The electric work machine 80 may further include a device storage 66. The electric work machine 80 may still further include a wireless control circuit 71 and the wireless communication circuit 22.

The wireless control circuit 71 includes a CPU 71*a* and a memory 71*b*. The wireless control circuit 71 is basically the same as the wireless control circuit 21 of the first embodiment, except that the wireless control circuit 71 includes a function to perform data communication with the device control circuit 61. In the electric work machine 80, the wireless control circuit 71 and the wireless communication circuit 22 correspond to the first transmission terminal 10-1 of the first embodiment.

The power-supply circuit 62 supplies an electric power to parts of the electric work machine 80 that include the device control circuit 61 and the wireless control circuit 71. Specifically, the electric work machine 80 is configured such that a battery 90 is attachable to and detachable from the electric work machine 80. The power-supply circuit 62 receives the electric power from the battery 90, which is attached to the electric work machine 80, to thereby supply the electric power to the parts of the electric work machine 80.

The power-supply circuit 62 may be configured in any manner. The power-supply circuit 62 may be configured, for example, to incorporate therein a battery and supply an electric power of the battery. The power-supply circuit 62 may include a conversion circuit that converts a voltage of the battery and output the voltage that is converted by the conversion circuit.

The device control circuit 61 controls the motor 63. The control circuit 61 drives the motor 63 in response to, for example, a not shown manipulation switch being manipulated. A rotational driving force of the motor 63 is transmitted to the driving mechanism 64. The driving mechanism 64 has a work output member 65 attached thereto. The work output member 65 may be fixed to the driving mechanism 64 or detachable from the driving mechanism 64. The driving mechanism 64 drives the work output member 65, which is attached to the driving mechanism 64, with the rotational driving force transmitted from motor 63.

The work output member 65 is configured to achieve the function of the electric work machine 80 by acting on a work target, which is external to the electric work machine 80, in other words, by applying energy to the work target. The work output member 65 may be, for example, a rotational blade that is configured to rotate to mow out grass and a small-diameter tree. Furthermore, the work output member 65 may be, for example, a drill bit that is configured to rotate, to thereby drill a workpiece.

The device control circuit 61 further stores various information on a state of the electric work machine 80 in the device storage 66. The various information to be stored in the device storage 66 may include, for example, the number of times the aforementioned manipulation switch is manipulated, a value of a current to be supplied to the motor 63, and the like.

The electric work machine 80 configured as above substantially includes the first transmission terminal 10-1 of the first embodiment and functions as the first transmission terminal 10-1.

(4-6) In the third embodiment, the polling is executed with respect to the data server 70 in S155. However, the polling may be executed at any timing. For example, the polling may be repeatedly executed at a constant time interval or may be executed in response to an arrival of a fixed time or fixed time and date.

(4-7) The management system 1 may be able to manage, as a target to be managed, various machines, equipment, or devices that are different from the electric work machine. The target to be managed may include various work machines that are not provided with a motor. For example, the target to be managed may include various work machines (for example, various tools, grass cutters, and circular saws) that are provided with an internal combustion engine.

(4-8) The management device 60 and the data server 70 may be arranged in the same casing. Specifically, one information processor may have both the function of the management device 60 and the function of the data server 70.

(4-9) Two or more functions performed by a single element in the aforementioned embodiments may be achieved by two or more elements, or a function performed by a single element may be achieved by two or more elements. Furthermore, two or more functions performed by two or more elements may be achieved by a single element, or a function achieved by two or more elements may be achieved by a single element. Also, a part of a configuration in the aforementioned embodiments may be omitted. Moreover, at least a part of a configuration in the aforementioned embodiments may be added to or replaced with another configuration in the aforementioned embodiments.

What is claimed is:

1. A communication device comprising:
    a storage;
    a first wireless communication circuit including an antenna, the first wireless communication circuit being configured to receive a first radio wave through the antenna and subsequently demodulate the first radio wave, the first radio wave being repeatedly transmitted from a first transmission device, the first transmission device (i) being configured to be connected to an electric work machine or being connected to an electric work machine and (ii) being configured to modulate the first radio wave to be transmitted based on a first information every time a transmission timing arrives in the first transmission device, the first information corresponding to the first transmission device;
    an information obtaining circuit configured (i) to obtain the first information through the first wireless communication circuit based on a first event occurring or having occurred and (ii) to avoid obtaining the first information through the first wireless communication circuit before occurrence of the first event, wherein the first event (i) corresponds to an event to confirm whether the first information is to be received and (ii) excludes a reception of the first radio wave by the first wireless communication circuit; and
    a storing processing circuit configured to store the first information from the information obtaining circuit into the storage.

2. The communication device according to claim 1, wherein the first event includes an event in which a confirmation request is made to the communication device, the confirmation request requesting for a confirmation on whether the first information is to be received.

3. The communication device according to claim 2, further comprising a user interface configured to receive a request manipulation made by a user of
    the communication device, the request manipulation requesting for the confirmation on whether the first information is to be received,
    wherein the confirmation request is made to the communication device based on the user interface receiving or having received the request manipulation.

4. The communication device according to claim 2, further comprising a second wireless communication circuit configured to receive a second radio wave including a confirmation command, the confirmation command commanding the communication device to confirm whether the first information is to be received,
    wherein the confirmation request is made to the communication device based on the second wireless communication circuit receiving or having received the confirmation command.

5. The communication device according to claim 2, further comprising:
    a second wireless communication circuit configured to transmit a second radio wave and receive a third radio wave;
    a query circuit configured to make a query, via the second wireless communication circuit, to a first information processor, whether a receipt confirmation of the first information is required, the first information processor being independent from the communication device; and
    a response obtaining circuit configured to obtain, via the second wireless communication circuit, a response transmitted from the first information processor in response to the query,
    wherein the confirmation request is made to the communication device based on the response obtained by the response obtaining circuit indicating that the receipt confirmation of the first information is required.

6. The communication device according to claim 1, wherein the first event includes an event in which a confirmation timing arrives.

7. The communication device according to claim 6, further comprising an operation setting circuit configured to alternatively set a confirmation operation of the information obtaining circuit to enabled or disabled,
    wherein the information obtaining circuit is configured to obtain the first information through the first wireless communication circuit based on (i) the confirmation operation being enabled and (ii) the confirmation timing arriving or having arrived.

8. The communication device according to claim 7, wherein the information obtaining circuit is configured to stop obtaining the first information through the first wireless communication circuit based on (i) the confirmation operation being disabled and (ii) the confirmation timing arriving or having arrived.

9. The communication device according to claim 6, further comprising a state setting circuit configured to change a state of the communication device from a first state to a second state based on the first event having occurred for a specified number of times or more in the first state,
    wherein the information obtaining circuit of the communication device in the second state is configured to stop obtaining the first information from the first wireless communication circuit.

10. The communication device according to claim 9, wherein the state setting circuit is configured to change the state of the communication device to the first state based on (i) the communication device being set to the second state and (ii) a predetermined setting change condition being fulfilled or having been fulfilled.

11. The communication device according to claim 10, wherein the predetermined setting change condition is fulfilled based on a specified time arriving or having arrived.

12. The communication device according to claim 1, further comprising:
    a second wireless communication circuit configured to transmit a second radio wave; and
    a transmission circuit configured to wirelessly transmit, via the second wireless communication circuit, the first information obtained by the information obtaining circuit to a second information processor, the second information processor being independent from the communication device.

13. The communication device according to claim 12, wherein the first wireless communication circuit is configured to receive the first information wirelessly transmitted in accordance with a first telecommunication method, and
wherein the second wireless communication circuit is configured to wirelessly transmit the first information in accordance with a second telecommunication method, the second telecommunication method being different from the first telecommunication method.

14. The communication device according to claim 1, wherein the first information includes a first identifier and/or a second identifier, the first identifier identifying the first transmission device, and the second identifier identifying the electric work machine connected to the first transmission device.

15. The communication device according to claim 1, wherein the first wireless communication circuit is configured to receive, in addition to the first information, a second information corresponding to and wirelessly transmitted from a second transmission device, the second transmission device being independent from the first transmission device, and
wherein the information obtaining circuit is configured to obtain the first information and/or the second information through the first wireless communication circuit within a specified time period including a time when the first event occurs, based on the first event occurring or having occurred.

16. A communication system comprising:
a communication device including:
    a first wireless communication circuit including an antenna, the first wireless communication circuit being configured to receive a first radio wave through the antenna and subsequently demodulate the first radio wave, the first radio wave being repeatedly transmitted from a transmission device, the transmission device (i) being connected to an electric work machine and (ii) being configured to modulate the first radio wave to be transmitted based on a first information every time a transmission timing arrives in the transmission device, the first information corresponding to the transmission device;
    a second wireless communication circuit configured to transmit a second radio wave;
    an information obtaining circuit configured (i) to obtain the first information through the first wireless communication circuit based on a first event occurring or having occurred and (ii) to avoid obtaining the first information through the first wireless communication circuit before occurrence of the first event, wherein the first event (i) corresponds to an event to confirm whether the first information is to be received and (ii) excludes a reception of the first radio wave by the first wireless communication circuit; and
    a transmission circuit configured to wirelessly transmit to an information processor, via the second wireless communication circuit, the first information obtained by the information obtaining circuit; and
the information processor configured to obtain the first information wirelessly transmitted from the communication device.

17. A communication system comprising:
a transmission device connected to an electric work machine, the transmission device being configured (i) to repeatedly transmit a radio wave and (ii) to modulate the radio wave to be transmitted based on a first information every time a transmission timing arrives, the first information corresponding to the transmission device, and
a communication device including:
    a storage;
    a wireless communication circuit including an antenna, the wireless communication circuit being configured to receive the radio wave through the antenna and subsequently demodulate the radio wave,
    an information obtaining circuit configured (i) to obtain the first information through the wireless communication circuit based on a first event occurring or having occurred and (ii) to avoid obtaining the first information through the wireless communication circuit before occurrence of the first event, wherein the first event (i) corresponds to an event to confirm whether the first information is to be received and (ii) excludes a reception of the radio wave by the wireless communication circuit; and
    a storing processing circuit configured to store the first information from the information obtaining circuit into the storage.

18. A communication method, comprising:
receiving a radio wave from a transmission device connected to an electric work machine, the transmission device being configured (i) to repeatedly transmit the radio wave and (ii) to modulate the radio wave to be transmitted based on a first information every time a transmission timing arrives in the transmission device;
demodulating the radio wave received;
storing the first information from the radio wave into a storage based on a first event occurring or having occurred, wherein the first event (i) corresponds to an event to confirm whether the first information is to be received and (ii) excludes a reception of the radio wave; and
avoiding storing the first information from the radio wave into the storage before occurrence of the first event.

19. The communication device according to claim 1, wherein the information obtaining circuit and the storing processing circuit are integrated in a control circuit, the control circuit being programmed to:
avoid obtaining the first information through the first wireless communication circuit before occurrence of the first event;
obtain the first information through the first wireless communication circuit based on the first event occurring or having occurred; and
store the first information that has been obtained into the storage.

20. The communication device according to claim 4, wherein the first transmission device is configured to transmit the first radio wave in accordance with a first communication method, and
wherein the second wireless communication circuit is configured to receive the second radio wave from a first information processor in accordance with a second communication method, the first information processor being independent from the first transmission device, the second communication method being different from the first communication method.

21. The communication device according to claim 6, wherein the confirmation timing (i) arrives periodically, (ii) corresponds to a preset time, and/or (iii) corresponds to a preset time and date.

* * * * *